US011223300B2

(12) United States Patent
Feng et al.

(10) Patent No.: US 11,223,300 B2
(45) Date of Patent: Jan. 11, 2022

(54) ENERGY-HARVESTING SENSOR SYSTEM AND METHOD THEREFOR

(71) Applicant: CASE WESTERN RESERVE UNIVERSITY, Cleveland, OH (US)

(72) Inventors: Philip X. L. Feng, Beachwood, OH (US); Peng Wang, Beachwood, OH (US); Zenghui Wang, Shaker Heights, OH (US); Ran Wei, Shaker Heights, OH (US); Xu-Qian Zheng, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 806 days.

(21) Appl. No.: 16/066,647

(22) PCT Filed: Dec. 28, 2016

(86) PCT No.: PCT/US2016/068926
§ 371 (c)(1),
(2) Date: Jun. 27, 2018

(87) PCT Pub. No.: WO2017/117247
PCT Pub. Date: Jul. 6, 2017

(65) Prior Publication Data
US 2019/0020290 A1 Jan. 17, 2019

Related U.S. Application Data

(60) Provisional application No. 62/271,895, filed on Dec. 28, 2015.

(51) Int. Cl.
*G06F 1/26* (2006.01)
*H02N 2/18* (2006.01)
(Continued)

(52) U.S. Cl.
CPC ............. *H02N 2/188* (2013.01); *G01H 11/08* (2013.01); *G06F 1/3203* (2013.01); *H02J 7/00* (2013.01);
(Continued)

(58) Field of Classification Search
CPC . H02N 2/188; H02N 2/181; H02J 7/00; H02J 50/20; H02J 7/34; H04W 52/0277; G06F 1/3203; G01H 11/08
(Continued)

(56) References Cited

U.S. PATENT DOCUMENTS 7,081,693 B2   7/2006  Hamel et al.
7,777,623 B2   8/2010  Albsmeier et al.
(Continued)

FOREIGN PATENT DOCUMENTS

EP         2685220 A2    1/2014

OTHER PUBLICATIONS

Gasnier et al., "Power conversion and integrated circuit architecture for high voltage piezoelectric energy harvesting", New Circuits and Systems Conference (NEWCAS), Jun. 17, 2012 (Jun. 17, 2012), pp. 377-380.

*Primary Examiner* — Volvick Derose
(74) *Attorney, Agent, or Firm* — Tarolli, Sundheim, Covell & Tummino LLP (57) ABSTRACT

A sensor network that is easy to deploy and substantially maintenance-free is disclosed. Sensor networks in accordance with the present invention include a base station and at least one sensor node that is operative for monitoring the occupancy of an area and wirelessly communicating information to the base station. The sensor node includes an energy harvester for converting ambient energy into electrical energy and an energy manager that enables self-powering of the sensor node using only the electrical energy (Continued)

derived from the ambient energy. The energy manager also includes a cold-start module that enables initiation of sensor-node operation even in the absence of any stored energy onboard the sensor node.

20 Claims, 7 Drawing Sheets

(51) Int. Cl.
| | |
|---|---|
| *G06F 1/3203* | (2019.01) |
| *G01H 11/08* | (2006.01) |
| *H02J 50/20* | (2016.01) |
| *H04W 52/02* | (2009.01) |
| *H02J 7/34* | (2006.01) |
| *H02J 7/00* | (2006.01) |
| *G06F 1/3215* | (2019.01) |

(52) U.S. Cl.
CPC ............... *H02J 7/34* (2013.01); *H02J 50/20* (2016.02); *H02N 2/181* (2013.01); *H04W 52/0277* (2013.01); *G06F 1/3215* (2013.01)

(58) Field of Classification Search
USPC ........................................................ 713/321
See application file for complete search history.

(56) References Cited

U.S. PATENT DOCUMENTS

| | | | | |
|---|---|---|---|---|
| 8,502,507 | B1* | 8/2013 | White | H02N 3/00 322/2 A |
| 2004/0078662 | A1* | 4/2004 | Hamel | B60C 23/0411 714/22 |
| 2005/0017602 | A1* | 1/2005 | Arms | B60C 23/0413 310/339 |
| 2005/0209828 | A1* | 9/2005 | Blosser | G06F 3/013 702/190 |
| 2008/0017726 | A1* | 1/2008 | Neumann | G01D 21/00 237/2 A |
| 2009/0120200 | A1* | 5/2009 | Chakrabartty | G01N 29/043 73/808 |
| 2009/0309538 | A1* | 12/2009 | Xu | H01M 10/441 320/101 |
| 2010/0315046 | A1* | 12/2010 | Trainor | H01M 10/46 320/167 |
| 2012/0007441 | A1* | 1/2012 | John | H02J 50/50 307/104 |
| 2012/0068669 | A1 | 3/2012 | Trainor et al. | |
| 2012/0256492 | A1* | 10/2012 | Song | H02J 50/27 307/66 |
| 2014/0013851 | A1* | 1/2014 | van Liempd | B60C 23/0411 73/658 |
| 2014/0217261 | A1* | 8/2014 | De Groot | G01J 1/00 250/205 |

\* cited by examiner

ENERGY-HARVESTING SENSOR SYSTEM AND METHOD THEREFOR

CROSS REFERENCE TO RELATED APPLICATIONS

This application claims the benefit of U.S. Provisional Application Ser. No. 62/271,895, filed Dec. 28, 2015, entitled "Energy-Harvesting Wireless Sensor Platform and Method Therefor," which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to sensor systems and energy scavenging in general, and, more particularly, to self-powered sensor systems.

BACKGROUND OF THE INVENTION

The "Internet of Things (IOT)" envisions a world in which myriad sensors are distributed through the environment on vehicles, buildings, apparel, etc., to enable real-time monitoring of such things as environmental pollution, traffic flow, parking garage space, health parameters, and the like. One of the roadblocks for the successful implementation of the IOT, however, is the need to provide power to remote sensors and the communications systems through which they report information. Wiring remote sensors to a power grid is simply impractical in many cases, while battery-powered systems have high maintenance costs due to the need to periodically replace the batteries. As a result, energy-harvesting systems are viewed as key enablers for remote sensor systems since they allow for fully self-powered systems that would require little or no maintenance once deployed. In addition, a self-powered wireless sensor system would be simple to deploy since they can be easily mounted (e.g., using an adhesive patch) wherever desired without the need to run wires for communications or power.

An energy harvester converts available energy from its surrounding environment (i.e., ambient energy) into electrical energy that can be stored and/or used as necessary. Many energy-harvesting devices already exist for capturing energy from naturally occurring sources, such as wind, vibration, light, etc. For example, a typical tire-pressure monitoring system employs a piezoelectric device located within the volume of a tire. The piezoelectric device converts the mechanical energy associated with the motion and deformation of the tire into electrical energy, which is used to power an associated pressure sensor and wireless transmitter that provides the sensor output to the engine computer of the vehicle. Other common energy scavenging systems include solar panels that convert the optical energy of sunlight into electrical energy for use in a home, building, traffic signage, etc., as well as air turbines (e.g., windmills, etc.) that generate electrical energy from the energy associated with gas flow.

Unfortunately, conventional energy harvesters available today are not suitable for use in remote sensor nodes due to their low power-conversion efficiency and/or large size. Further, typical conventional mechanical energy harvesters function best when the mechanical energy input is strong and sustained. As a result, mechanical energy-sources that are weak, intermittent, or transient are generally overlooked or deemed unsuitable for many applications and are therefore wasted.

A self-powered wireless sensor system that can exploit weak, intermittent, and/or transient mechanical energy would be a significant advance in the state of the art.

SUMMARY OF THE INVENTION

The present invention enables a practical, low-cost, self-powered sensor system that can be deployed anywhere in which it would be subject to sustained or transient energy present in its environment (i.e., ambient energy), such as shock, vibration, etc. Embodiments of the present invention are particularly well suited for use in applications such as remote sensing, environmental sensing, building occupancy-based environmental control, and the like.

Embodiments of the present invention include self-powered sensor nodes that can include at least one sensor for measuring virtually any type of measurand (e.g., temperature, pressure, humidity, acceleration, nuclear activity, a chemical, etc.). In some embodiments, the system includes a sensor node that is mountable on a surface, such as a refrigerator surface, windows (which vibrate due to acoustic noise, wind, etc.), desk tops, and the like, such that mechanical energy transmitted by the surface is imparted to one or more energy scavenging devices included in the sensor node. In some embodiments, the system includes a sensor node that is suitable for embedding into a structure such as a chair cushion, floor mat, carpet, mattress pad, and the like. Sensor nodes in accordance with the present invention communicate with a base station via wireless protocols or, preferably, low-power wireless transmissions. In some embodiments, the base station is powered in conventional fashion, such as via the electric power grid and/or batteries. In some embodiments, the base station is operative for communicating with additional control circuitry and/or one or more controllers (e.g., computers, mobile devices, or other suitable energy management systems) that can control the setting of lighting, ambient temperature, and on/off states of one or more household electronics devices. In some embodiments, the base station includes a controller for controlling such external devices.

An illustrative embodiment of the present invention is a sensor system comprising a base station and a plurality of self-powered sensor nodes, each of which communicates with the base station via a wireless communications link. Each sensor node includes an energy harvesting system, a sensor module, an energy manager, energy storage units, a microcontroller, and a wireless transceiver. Each sensor node is dimensioned and arranged to mount to a surface such that at least some of the mechanical energy (e.g., vibration, etc.) associated with that surface is imparted to the energy harvester of the sensor node.

The energy harvesting system includes a plurality of mechanical energy harvesters that collectively convert vibrations and mechanical transients across a range of frequencies into electrical energy. The electrical output of the energy harvesting system is conditioned and stored by the energy manager. In some embodiments, an energy harvesting system includes at least one energy harvesting device that converts non-mechanical energy into electrical energy.

The energy manager includes multiple modules that enable it to condition and store electrical energy that is of extremely low power and/or of an intermittent or transient nature. This capability is enabled by a rectifier module that includes a plurality of rectification circuits that collectively rectify a bipolar electrical signal: (1) a transistor-bridge circuit; (2) an active-diode bridge circuit; and (3) a Schottky diode half-wave bridge circuit. Collectively, these rectifier circuits enable conversion of the bipolar electrical output of the energy harvesters into a unipolar electrical signal suitable for use by the sensor node and/or storage in the energy storage units. In some embodiments, only one of the transistor-bridge circuit and active-diode full-wave bridge circuit is included. In some embodiments, other conventional bridge circuits are included in the rectifier module. In some embodiments, the rectifier module includes signal conditioning electronics for conditioning a DC electrical signal received from the energy harvesting system.

In addition, the energy manager has a capability to energize the sensor node using only energy scavenged from the surrounding environment—even when the sensor node has no stored energy onboard. In some embodiments, this is achieved by charging a local energy-storage unit that serves to energize only circuitry located on the energy manager itself. Still further, the energy manager has multiple modes in which it can charge energy storage units, including a high-efficiency charging mode and a high-speed charging mode.

An embodiment of the present invention is a sensor system comprising a sensor node, wherein the sensor node includes: (1) a sensor module including a first sensor for providing a first signal that is based on a first measurand; (2) a harvester module including a first energy harvester that is operative for converting a first ambient energy into a first electrical signal; (3) an energy storage system; and (4) an energy manager that includes a converter that converts the first electrical signal into a second electrical signal, wherein the energy manager has multiple operational modes for charging the energy storage system, the multiple operational modes including a high-efficiency charging mode and a high-speed charging mode, and wherein the energy manager operates in the high-speed charging mode when the magnitude of the second electrical signal exceeds an input threshold.

Another embodiment of the present invention is a sensor system comprising a sensor node, wherein the sensor node includes: (1) a sensor module including a first sensor for providing a first signal that is based on a first measurand; (2) a harvester module having a first energy harvester for converting a first ambient energy into a bipolar electrical signal that is provided at a first node; (3) an energy storage system comprising (i) a first energy-storage unit that is dimensioned and arranged to power the entirety of the sensor node and (ii) a second energy-storage unit that is dimensioned and arranged to selectively power an energy manager when the first energy-storage unit has no stored energy; and (4) the energy manager, the energy manager including a converter for converting the bipolar electrical signal into a unipolar electrical signal, wherein the converter includes: (a) a first rectification circuit that is electrically connected between the first node and a second node, the first rectification circuit including a Zener diode; and (b) a first rectification path that is electrically connected between the first node and a second node, the first rectification path including a first active diode that is electrically connected in series with at least one of a second rectification circuit and a third rectification circuit, wherein the second rectification circuit rectifies the bipolar electrical signal only when the magnitude of the bipolar electrical signal exceeds a first value, and wherein the third rectification circuit rectifies the bipolar electrical signal only when a first voltage on the second storage unit is equal to or greater than a second value.

Yet another embodiment of the present invention is a method comprising: (1) locating a sensor node at a first location, the sensor node including a sensor for a first measurand, an energy harvester, an energy manager, a first energy-storage unit, and a second energy-storage unit; (2) converting a first ambient energy at the first location into a bipolar electrical signal; (3) converting the bipolar electrical signal into a unipolar electrical signal; (4) storing energy of the unipolar electrical signal in the first energy-storage unit, the first energy-storage unit being dimensioned and arranged to selectively power the energy manager; (5) charging the second energy-storage unit by storing energy of the unipolar electrical signal in the second energy-storage unit when the energy stored in the first energy-storage unit exceeds a first threshold, the second energy-storage unit being dimensioned and arranged to power the sensor node when the energy stored in the second energy-storage unit exceeds a second threshold; and (6) generating a first signal based on the first measurand at the first location.

DETAILED DESCRIPTION

Figure 1:
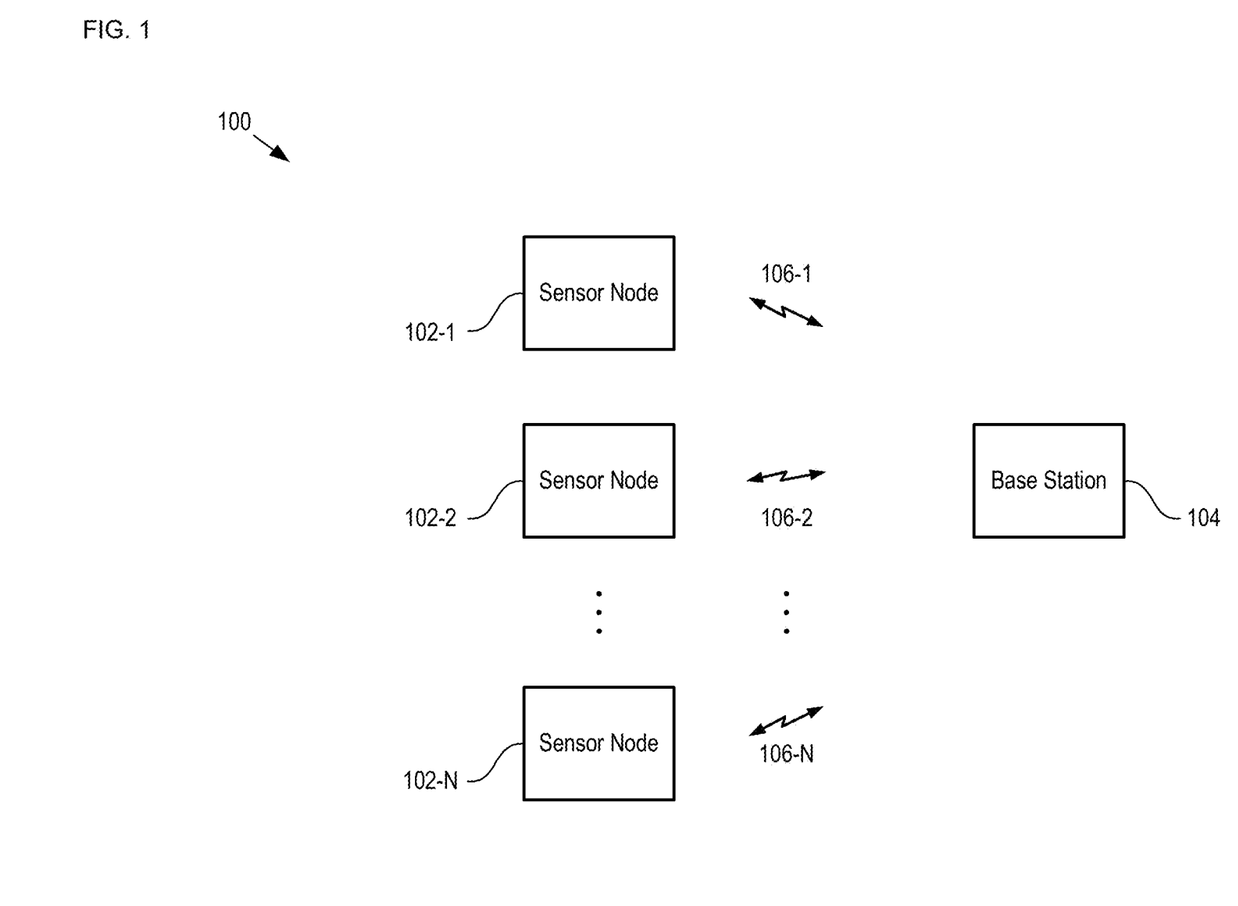
FIG. 1 depicts a schematic drawing of a sensor system in accordance with an illustrative embodiment of the present invention.

FIG. 1 depicts a schematic drawing of a sensor system in accordance with an illustrative embodiment of the present invention. System 100 includes sensor nodes 102-1 through 102-N and base station 104.

Sensor nodes 102-1 through 102-N (referred to, collectively, as sensor nodes 102) are self-powered sensor platforms capable of monitoring the occupancy of a region within a building by periodically measuring a plurality of environmental conditions and wirelessly reporting the resultant data to base station 104 as signals 106-1 through 106-N, respectively. An exemplary sensor node is described in detail below.

Base station 104 is a general purpose processor operative for acting as a gateway by communicating with sensor nodes 102 and issuing alerts and commands to sensor nodes 102 and other systems (e.g., light controllers, heating/air conditioning systems, etc.) based on signals 106-1 through 106-N (referred to, collectively, as signals 106). Typically, base station 104 is a computer, cell phone, etc. In some embodiments, base station 104 is included in another system that is in communication with the sensor system, such as a thermostat, furnace, land-line telephone, air conditioning system, electrical panel, television, lamp, and the like.

Figure 2:
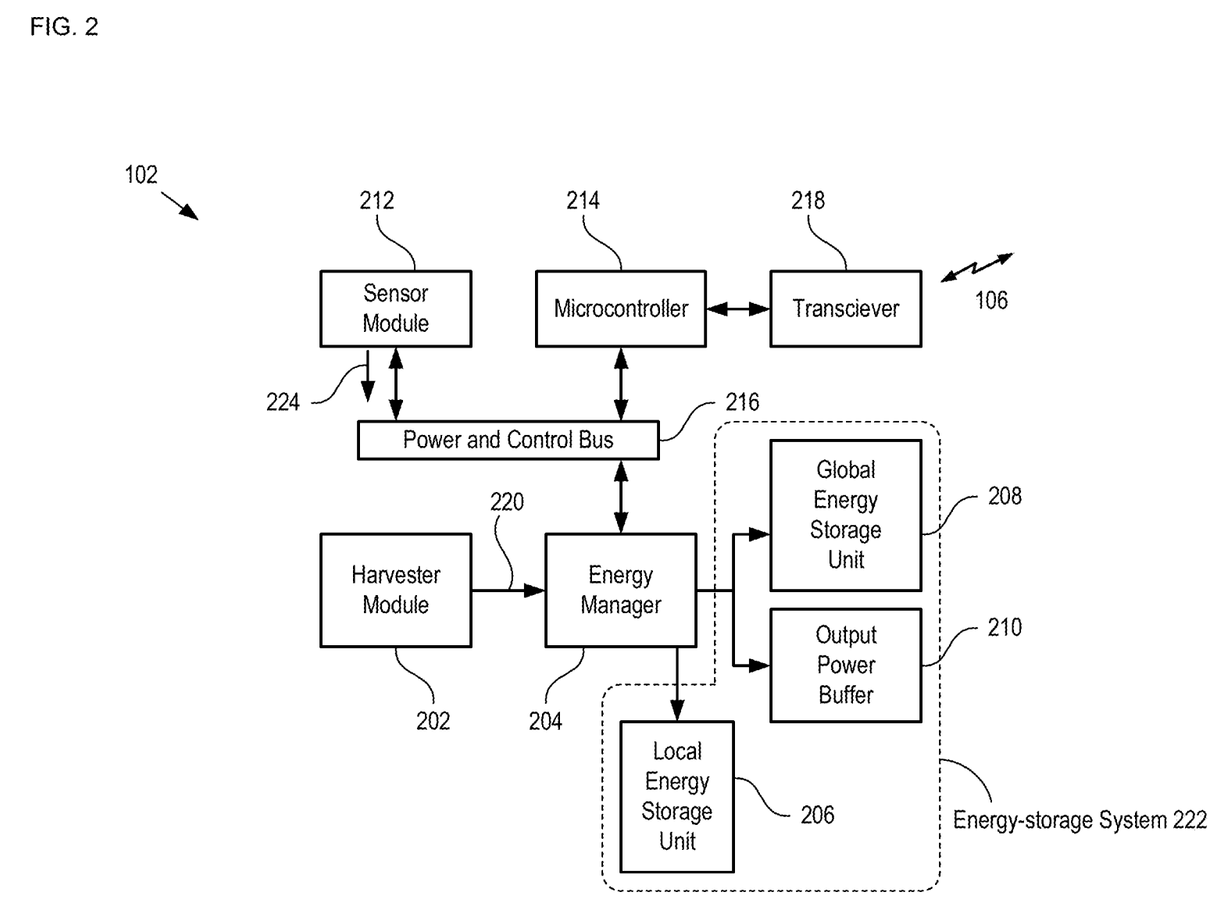
FIG. 2 depicts a schematic drawing of an exemplary sensor node in accordance with the illustrative embodiment.

FIG. 2 depicts a schematic drawing of an exemplary sensor node in accordance with the illustrative embodiment. Sensor node 102 includes harvester module 202, energy manager 204, local energy-storage unit 206, global energy-storage unit 208, output power buffer 210, sensor module 212, microcontroller 214, power and control bus 216, and transceiver 218. Sensor node 102 is exemplary of each of sensor nodes 102-1 through 102-N. As discussed below, the components of sensor node 102 enable it to lie dormant for extended periods of time, harvest mechanical energy from its ambient environment, emerge from dormancy via a fully self-contained cold-start function, store harvested electrical energy in onboard storage cells using in either of a high-efficiency or high-speed charging functionality, operate for extended periods of time based on this stored charge and/or additional harvested energy, measure one or more environmental conditions at its location, and report those results to base station 104 wirelessly and with low power consumption.

Harvester module 202 includes a plurality of mechanical-energy harvesting devices, each of which is dimensioned and arranged to generate electrical power in response to received mechanical energy (e.g., shock, vibration, acoustic energy, etc.). In the depicted example, each mechanical-energy harvesting device is a piezoelectric cantilever structure having a natural resonant frequency within the range of frequencies anticipated to be included in the mechanical energy. Each piezoelectric element within the plurality has a different resonant frequency such that, collectively, they convert a range of excitation frequencies with high conversion efficiency. In some embodiments, harvester module 202 includes a plurality of mechanical-energy harvesting devices whose resonant frequencies are matched to the same frequency of the excitation energy. In some embodiments, harvester module 202 includes at least one mechanical-energy harvesting device whose resonant frequency is tunable such that it can be matched to the frequency of the excitation energy applied to it. In some embodiments, harvester module 202 includes a single energy-harvesting device. Although the illustrative embodiment includes mechanical-energy harvesting devices that are piezoelectric cantilevers, myriad alternative mechanical-energy harvesting devices, such as disc resonators, plate resonators, spring-based resonators, etc., can be used in harvester module 202 without departing from the scope of the present invention.

Although the illustrative embodiment includes harvesting devices that convert mechanical energy, such as shock and vibration, into electrical energy, it will be clear to one skilled in the art, after reading this Specification, how to specify, make, and use alternative embodiments that include energy harvesting devices that convert other forms of energy into electrical energy without departing from the scope of the present invention. Other energy-harvesting devices suitable for use in the present invention include, without limitation, solar cells, photoelectric devices, RF-energy conversion devices, nuclear-energy conversion devices, electrochemical devices, turbogenerators, and the like.

Energy manager 204 is a system for conditioning and managing the electrical energy generated by harvester module 202. Energy manager 204 also controls the power supplied to each sensor in sensor module 212 in response to requests from microcontroller 214. Typically, energy manager 204 is implemented in an application-specific integrated circuit (ASIC) and is also operative for providing a stable power output for a timing unit (such as a stand-alone real-time clock (RTC) or a timing unit included in a microcontroller), while powering off other components individually to minimize system idle power. Energy manager 204 is described in more detail below and with respect to FIGS. 5A-B.

Local energy-storage unit 206 is an energy storage device suitable for storing electrical energy that can be used to power only energy manager 204 when a limited amount of electrical energy is available. In the depicted example, local energy-storage unit 206 is a 100 nanofarad (nF) capacitor, which can be quickly charged due to its small capacitance. It should be noted, however, that myriad energy storage elements (e.g., thin-film batteries, solid-state batteries, etc.) can be used in local energy-storage unit 206 without departing from the scope of the present invention.

Global energy-storage unit 208 is an energy-storage system operative for storing energy sufficient to power all of the components of sensor node 102 for several months without additional energy provided by harvester module 202 (or any other energy source). In the depicted example, global energy-storage unit 208 is a 3F supercapacitor; however, other energy storage devices/systems can be used in sensor node 102 without departing from the scope of the present invention. In some embodiments, the global energy-storage unit 208 includes one or more supercapacitors that, when fully charged, can store energy for several months.

Output power buffer 210 is an energy storage device operative for buffering the energy provided to sensor node 102 from global energy-storage unit 208. In the depicted example, output power buffer 210 is a 1 millifarad (mF) capacitor that is maintained at approximately 3V during normal operation of the sensor node; however, other energy storage devices/systems can be used in output power buffer 210 without departing from the scope of the present invention.

Local energy-storage unit 206, global-energy storage unit 208, and output power buffer 210 collectively define energy-storage system 222.

Sensor module 212 is a sensor configuration that is operative for monitoring a plurality of conditions that are indicative of the occupancy of an area within a building, such as an office, restroom, conference area, kitchen, etc. Sensor module 212 includes a plurality of environmental sensors that are collectively operative for sensing temperature, humidity, pressure, vibration, and ambient light level. In some embodiments, sensor module 212 is designed for an application other than occupancy monitoring and, therefore, includes a different sensor configuration. Sensors suitable for inclusion in sensor module 212 include, without limitation, sensors operative for sensing shock, vibration, pressure, humidity, light intensity, acceleration, gravity, magnetic field, and the like. In some embodiments, sensor module 212 includes only a single sensor. In some embodiments, at least a portion of sensor module 212, such as conditioning circuitry and/or one or more sensor devices (e.g., a temperature sensor, an accelerometer, etc.), is included in energy manager 204.

Microcontroller 214 is a conventional microcontroller operative for controlling the operations of node 102, such as reading sensor data and communicating with base station 104 via transceiver 218. In the depicted example, microcontroller 214 includes a ferroelectric random-access-memory (FRAM) for storing sensor data, among other things.

Sensor module 212 and microcontroller 214 are electrically coupled with energy manager 204 via power and control bus 216, which is a conventional electrical bus operative for conveying power and information between different components. In some embodiments, power and control bus 216 comprises multiple bus networks for separately handling power and signaling between the components of energy manager 102.

Transceiver 218 is a Zigbee wireless communications module that is electrically coupled with microcontroller 214 to enable the microcontroller to transmit and receive information and commands between sensor node 102 and base station 104 via low-power wireless communications link 106. In some embodiments, transceiver 218 communicates with base station 106 via a wired link. In some embodiments, transceiver 218 comprises a modified Zigbee module that enables lower-power transmissions. Although the illustrative embodiment includes a transceiver that comprises a Zigbee module, it will be clear to one skilled in the art, after reading this Specification, how to specify, make, and use alternative embodiments of the present invention that comprise a different transceiver configuration and/or protocol. Wireless protocols suitable for use in embodiments of the present invention include, without limitation, short-range wireless protocols/systems (e.g., protocols based on the IEEE 802.15.4 family of standards, Bluetooth, Bluetooth Smart/BLE, RFID, RF3CE, WiFi, 6LoWPAN, EnOcean, Z-Wave, WirelessHART, etc.), long-range wireless protocols/systems (e.g., LTE, LTE CAT M1, 5G, LoRA™, etc.), and the like.

One of the significant challenges that has limited the utility of prior-art systems powered by energy harvesting is an inability to initiate operation with substantially zero stored energy onboard (i.e., execute a cold start). As a result, conventional systems must include some sort of energy reserve (e.g., back-up batteries, etc.) at all times, which must be monitored and serviced periodically. Embodiments of the present invention derive significant advantages over prior-art systems by including an energy manager that enables a cold start of a sensor node when there is zero stored energy onboard a sensor node.

Figure 3:
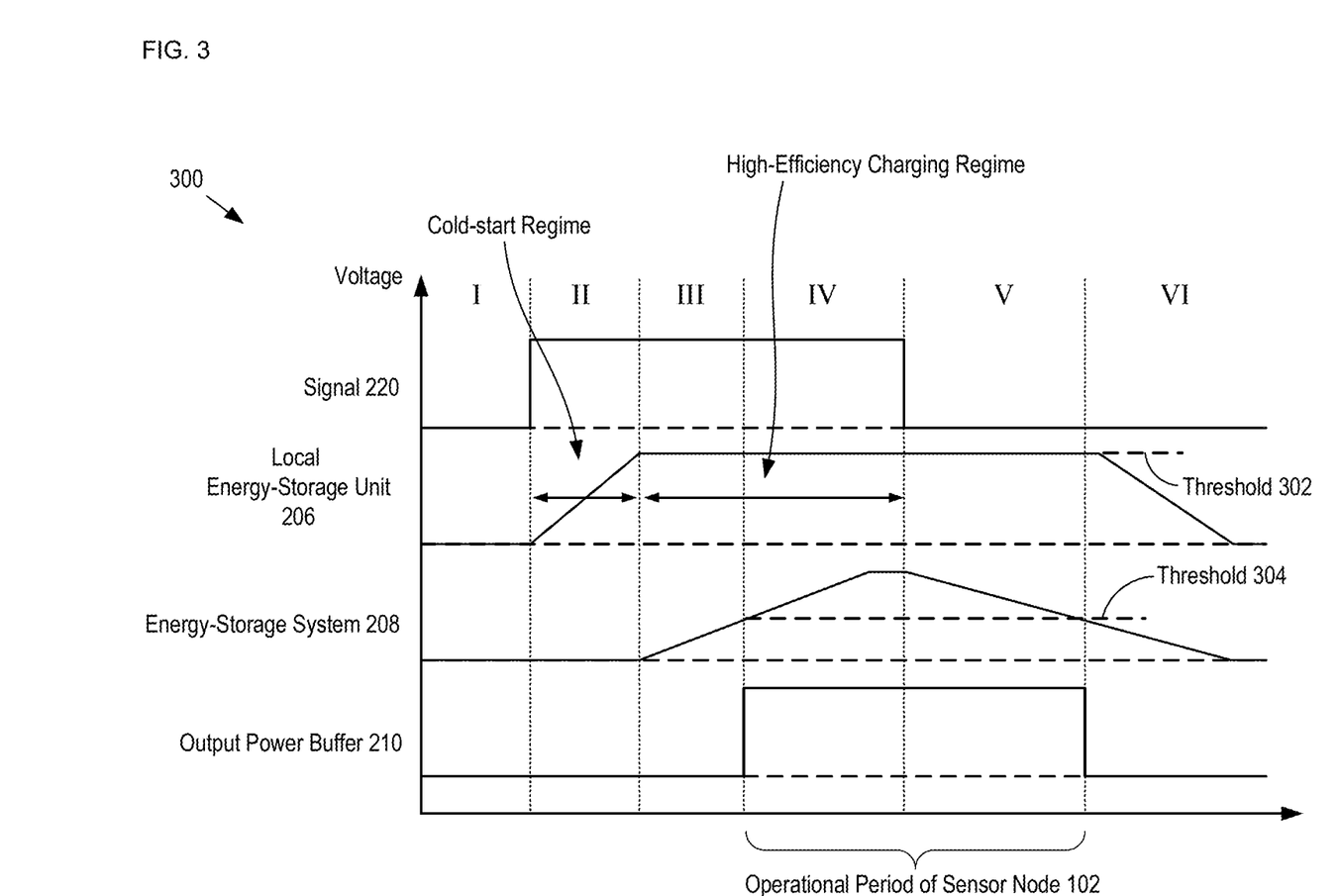
FIG. 3 depicts a timing diagram for a representative power cycle of a sensor node in which the node begins in a dormant state, moves into an operational state via a cold start, and returns back to a dormant state.

FIG. 3 depicts a timing diagram for a representative power cycle of a sensor node in which the node begins in a dormant state, moves into an operational state via a cold start, and returns back to a dormant state. Cycle 300 includes several distinct phases of operation of sensor node 102: Phase I, in which the sensor node is dormant; Phase II (the cold-start regime), in which a cold-start module on energy manager 204 is directly charged with the energy derived from bipolar signal 220; Phase III, in which the local energy-storage unit is fully charged and additional energy derived from bipolar signal 220 is used to charge global energy-storage unit 208; Phase IV, in which the energy level of global energy-storage unit 208 exceeds a threshold level, at which time power is provided to all of the components of sensor node 102 via output power buffer 210; Phase V, in which the ambient excitation energy is no longer provided to the sensor node and the energy to power the sensor node is drawn from global energy-storage unit 208; and Phase VI, in which the energy contained in global energy-storage unit 208 is lower than the desired threshold, which initiates a return of the sensor node to its dormant state.

Figure 4:
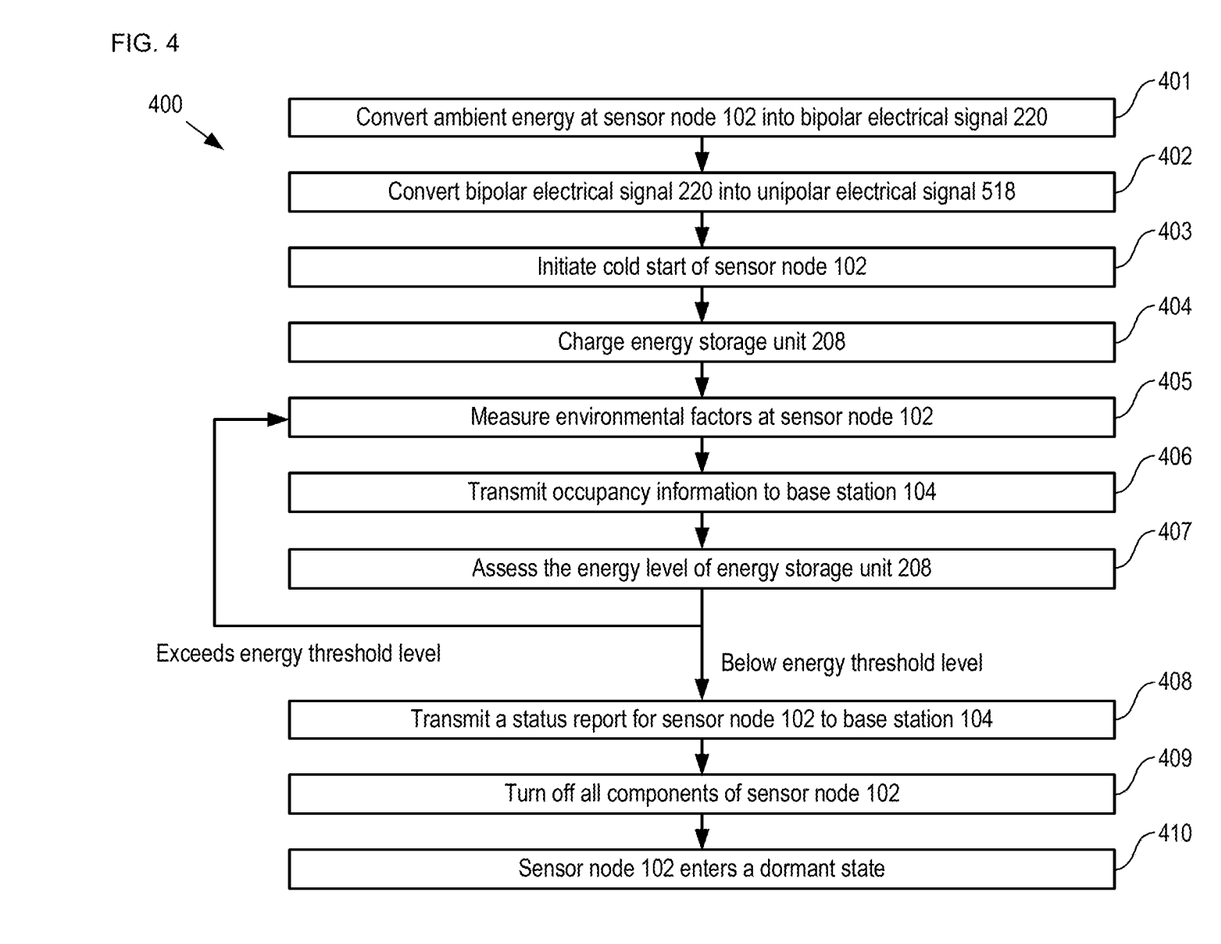
FIG. 4 depicts operations of an exemplary method of operation for system 100, in which the system begins in its dormant state (i.e., sensor node 102 has substantially no energy stored in either local energy-storage unit 206 or global energy-storage unit 208).

FIG. 4 depicts operations of an exemplary method of operation for system 100, in which the system begins in its dormant state (i.e., sensor node 102 has substantially no energy stored in either local energy unit 206 or global energy-storage unit 208). Method 400 begins with operation 401, wherein harvester module 202 generates bipolar electrical signal 220 from ambient mechanical energy and provides it to energy manager 204. Method 400 is described herein with continuing reference to FIGS. 2-3, as well as reference to FIGS. 5A-C, 6A-C, and 6-8.

Figures 5A, 5B:
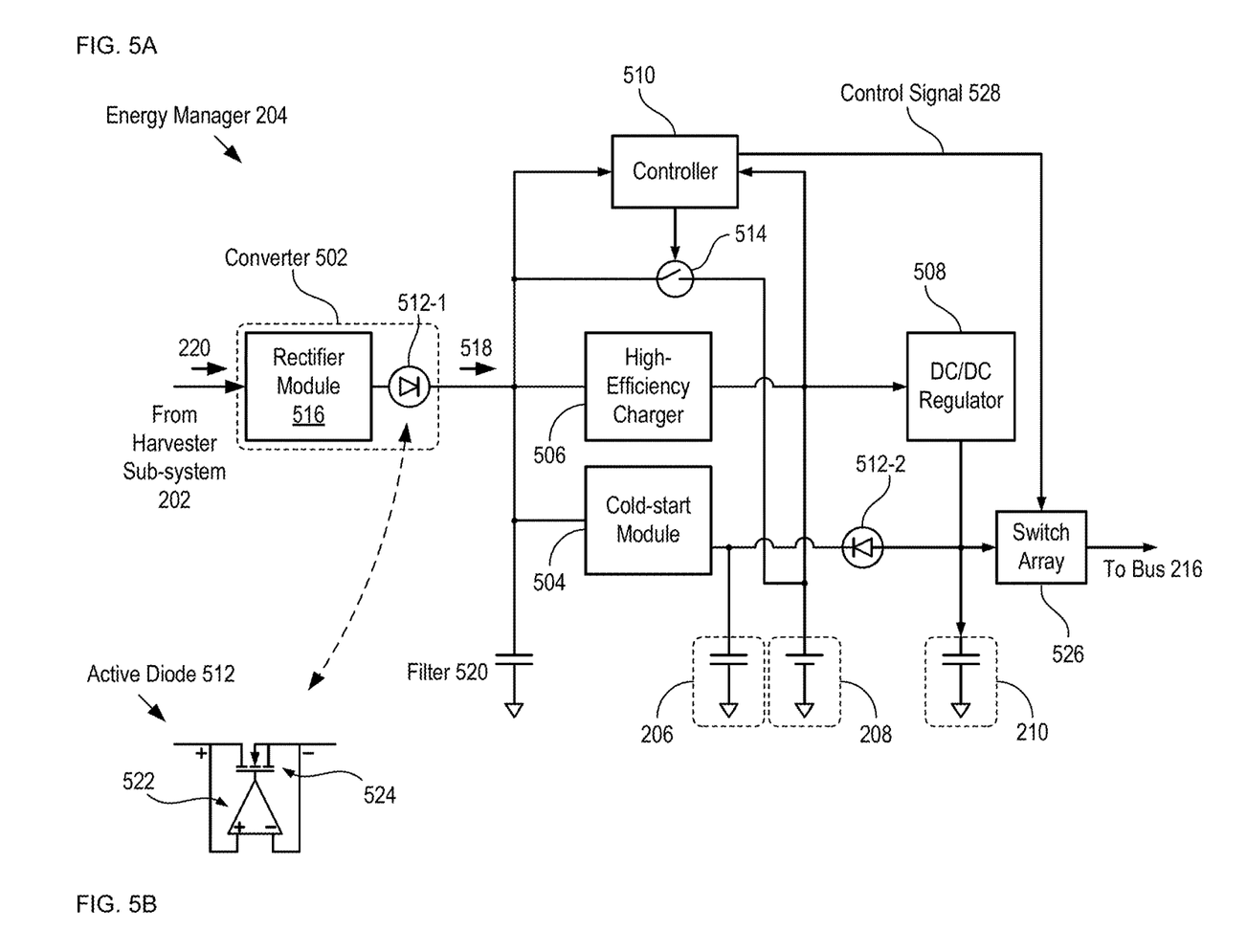
FIG. 5A depicts a schematic drawing of an energy manager in accordance with the present invention.
FIG. 5B depicts a schematic drawing of an exemplary active diode.

FIG. 5A depicts a schematic drawing of an energy manager in accordance with the present invention. Energy manager 204 includes converter 502, cold-start module 504, high-efficiency charger 506, DC/DC regulator 508, controller 510, active diodes 512-1 and 512-2, switch 514, and filter 520. The components of energy manager 204 define several key modules that afford significant advantages over the prior art—namely: 1) a bipolar-to-unipolar conversion module (converter 502) capable of converting extremely weak excitation energy, as well as energy transients; 2) a cold-start sub-system (cold-start module 504 and local energy-storage unit 206); 3) a dual-charging module that operates in either a high-efficiency manner (via high-efficiency charger 506) or a high-speed manner (via controller 510 and switch 514); and 5) an output regulator (DC/DC regulator 508).

At operation 402, converter 502 converts bipolar electrical signal 220 into unipolar electrical signal 518.

Filter 520 is a conventional capacitive filter element for smoothing the voltage ripple in unipolar electrical signal 518.

Figure 6A:
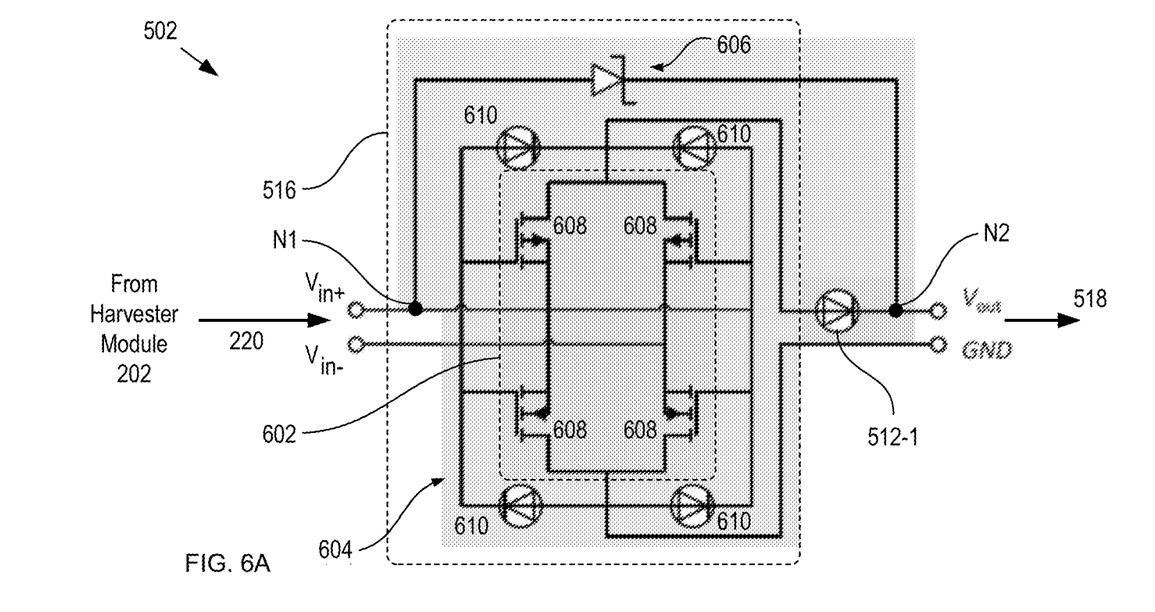
FIG. 6A depicts a schematic drawing of converter 502. Converter 502 includes rectifier module 516 and active diode 512-1.

FIG. 6A depicts a schematic drawing of converter 502. Converter 502 includes rectifier module 516 and active diode 512-1. Converter 502 is a negative to positive voltage converter (NVC), which rectifies bipolar electrical signal 220 provided by harvester module 202 into unipolar electrical energy 518. It is an aspect of the present invention that converter 502 enables conversion of a bipolar electrical signal into a unipolar electrical signal with higher efficiency than can be achieved in the prior art by virtue of an extremely low voltage drop and a parallel arrangement of multiple rectifier circuits. As a result, converters in accordance with the present invention enable a sensor node to store charge even when excited only by extremely low-level ambient energy excitations.

Converter 502 is electrically coupled with the energy harvesters of harvester module 202 such that bipolar electrical signal 220 enters energy manager 204 through rectifier module 516 and active diode 512-1. The converter is designed to have minimal voltage drop, making the rectification much more efficient than using p-n junction diodes or Schottky diodes. It should be noted that in embodiments in which harvester module 202 provides a DC electrical signal, energy manager 204 typically includes circuitry for conditioning this first DC electrical signal to provide a second DC signal whose energy is more conveniently stored in local energy-storage unit 206 and global energy-storage unit 208.

FIG. 5B depicts a schematic drawing of an exemplary active diode. Active diode 512 includes servo amplifier 522 and PMOS transistor 524. Active diode 512 is characterized by a turn-on voltage (typically about 0.2V). When biased with a voltage that exceeds its turn-on voltage, active diode 512 becomes operative. Active diode 512 is representative of each of active diodes 512-1 and 512-2, as well as active diodes 610. It should be noted that, in some embodiments, different active diodes can have different turn-on voltages.

Returning now to FIG. 6A, rectifier module 516 includes multiple rectification circuitry: (1) transistor bridge 602, which includes four transistors 608; (2) active-diode bridge 604, which includes four active diodes 610 that are biased by the voltage on output power buffer 210; and (3) Schottky-diode half-wave bridge 606. By virtue of these various rectification circuits, converter 502 is operative for capturing the energy of bipolar electrical signal 220 even when its amplitude varies over a wide range from very low to very high, as well as when there is no energy already stored on board the sensor node. In some embodiments, rectifier module 516 includes a different number of rectifier circuits. For example, in some embodiments, transistor bridge 602 is not included. In other embodiments, active-diode bridge 604 is not included. In some embodiments, additional rectifier circuits (e.g., a diode-based rectifier circuit, etc.) is included in rectifier module 516.

Transistor bridge 602 is operative for rectifying bipolar signal 220 when its amplitude is moderate to high. In transistor bridge 602, bipolar electrical signal 220 directly drives the gate of each of transistors 608, each of which is a conventional p-channel MOSFET. As a result, when bipolar electrical signal 220 is ≥0.7 volts, transistors 608 are fully turned on and the voltage drop across them ($V_{DS}$) is very low (~20 mV).

Active-diode bridge 604 is operative for rectifying bipolar signal 220 even when its amplitude is extremely low, as long as there is some energy stored in sensor node 102. In active-diode bridge 604, each of active diodes 610 is biased by the voltage on local energy-storage unit 206. When the magnitude of bipolar electrical signal 220 is <0.7V, transistors 608 do not turn on; however, if the voltage on local energy-storage unit 206 is greater than the turn-on voltage of active diodes 610, bipolar signal 220 is rectified via active-diode bridge 604, which efficiently rectifies the signal with minimal voltage drop (~20 mV). Each of active diodes 610 is analogous to active diode 512.

Bridges 602 and 604 are electrically connected in parallel and the parallel combination of bridges is electrically connected in series with active diode 512-1 between nodes N1 and N2. As a result, the rectified outputs from each of bridges 602 and 604 go through active diode 512-1, which is biased with the voltage on output power buffer 210. When there is sufficient energy stored in the sensor node, active diode 512-1 is operational and acts to block the flow of energy back into the rectifier circuits.

Schottky-diode half-wave bridge 606 is operative for partially rectifying bipolar signal 220 when its amplitude is lower than the turn-on voltage of transistors 608 (approximately 0.7V) and there is little or no energy stored in the sensor node. Under these conditions, transistor bridge 602 is non-functional because bipolar signal 220 is insufficient to turn transistors 608 on and active-diode bridge 604 is non-functional because there is insufficient energy to sufficiently bias active diodes 610. In addition, since active diode 512-1 also remains off, it acts substantially as an open circuit for both of bridges 602 and 604 between nodes N1 and N2. Under these conditions, therefore, cold start module 306 is electrically coupled with the output of harvester module 202 only through Schottky-diode half-wave bridge 606. In the depicted example, Schottky-diode half-wave bridge 606 incurs only a 100 mV voltage drop.

The use of an active diode in converter 502 (as well as elsewhere in energy manager 204) affords embodiments of the present invention with particular advantage over the prior art due to its very low voltage dropout (approximately 10 mV or less), which wastes little energy. In addition, an active diode is substantially self-controlling, which avoids the need for complex control circuitry, as well as its additional energy loss.

Figure 6B:
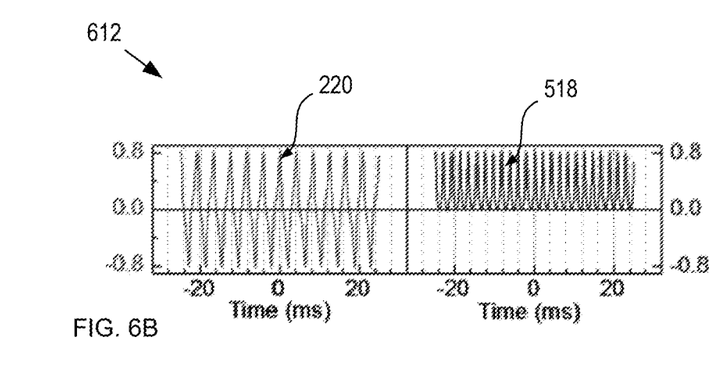
FIG. 6B depicts experimental results for the operation of transistor bridge 602.

FIG. 6B depicts experimental results for the operation of transistor bridge 602. Plot 612 demonstrates efficient conversion of bipolar input 220 to unipolar output signal 518 with only a ~10 mV drop.

Figure 6C:
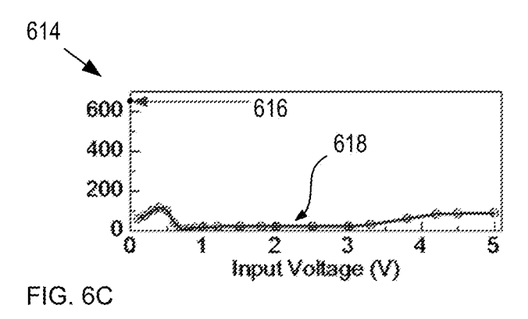
FIG. 6C depicts experimental results for the operation of active diode 512-1.

FIG. 6C depicts experimental results for the operation of active diode 512-1. Plot 614 depicts data point 616, which represents the typical voltage drop for a silicon-based p-n junction diode. Trace 618 shows the measured voltage drop of an active diode (e.g., active diodes 512 and 610), which is approximately 10-20 mV over the anticipated 1-3V working range of input voltage.

It should be noted that the very low voltage drops associated with converter 502 enable sensor node 102 to store electrical energy even when harvester module 202 generates only a few tens of millivolts in response to very weak ambient energy input.

At operation 403, energy manager 204 executes a cold start of sensor node 102 (i.e., sensor node 102 enters Phase II of power cycle 300), which begins with the direct charging of local energy-storage unit 206 via cold-start module 504 using rectified signal 518.

Figure 7:
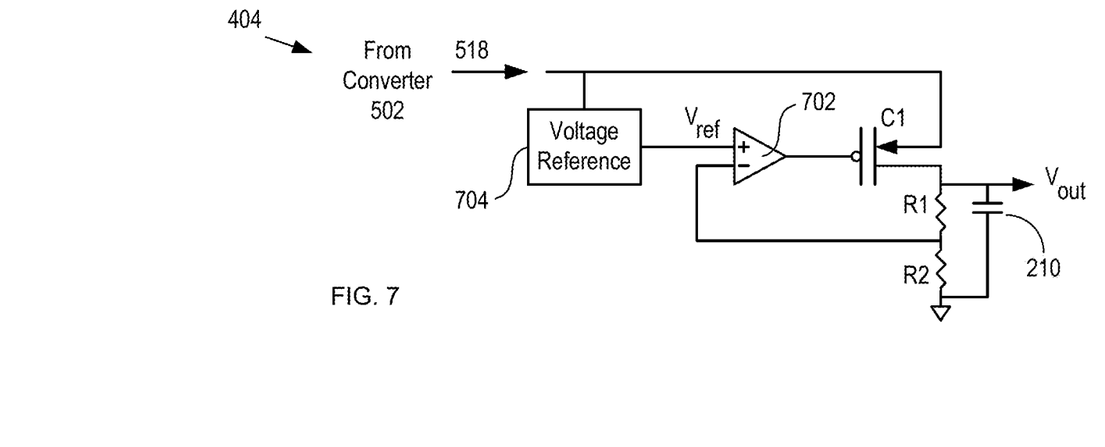
FIG. 7 depicts a schematic drawing of a cold-start module in accordance with the illustrative embodiment.

FIG. 7 depicts a schematic drawing of a cold-start module in accordance with the illustrative embodiment. Cold-start module 504 is a low-dropout (LDO) voltage regulator that includes servo amplifier 702, voltage reference 704, resistors R1 and R2, and capacitor C1. The LDO regulator is a passive circuit operative for boosting rectified signal 518 to enable it to quickly charge local energy-storage unit 206. In the depicted example, cold-start module 504 maintains output voltage $V_{out}$ at a constant 3V.

Cold-start module 504 is biased by conventional on-chip voltage reference 704, which is turned off when bipolar electrical signal 220 is zero (i.e., no mechanical energy is actively being converted by harvester module 202) to save power. In the depicted example, the voltage reference has a bias current as low as 7 nA. During operation 403, the current consumption of cold-start module 504 is approximately 1 µA; however, once local energy-storage unit 206 is fully charged, the LDO regulator is bypassed and its power consumption of cold-start module 504 drops to less than 1 µA.

It should be noted that the ability of the low dropout regulator in cold-start module 504 to regulate its output voltage at a desired set level also mitigates damage to circuit elements within energy manager 204 from high voltages that can be generated by the harvester elements of harvester module 202. Further, in some embodiments, cold-start module 504 includes a voltage booster to up-convert rectified signal 518 when it has a low voltage level, such as when it is generated by harvester module 202 in response to low-level excitations.

In the depicted example, cold-start module 504 operates entirely using only the energy provided by harvester module 202 (i.e., it uses none of the stored energy on board). In some embodiments, over a large input range (2-5V), the output of cold-start module 504 is maintained either at a set voltage (e.g., at ~3V) or at the input voltage, whichever is smaller (input voltage higher than 5.9V is handled by the high-speed charging circuitry).

At operation 404, energy manager 204 charges global energy-storage unit 208. Operation 404 commences once controller 510 detects that the voltage on local energy-storage unit 206 is equal to threshold value 302 (3V in the depicted example), when the sensor node enters Phase III.

As noted above, prior-art systems employing conventional ambient-energy-harvesting approaches are only capable of harvesting relatively large, substantially steady-state inputs from strong and substantially steady energy sources. In contrast, energy manager 204 is configured as a dual-harvesting system having a high-efficiency charging channel, as well as a high-speed charging channel. It employs an adaptive energy harvesting approach that can be employed such that (1) the high-speed channel is used when transient inputs are detected and (2) the high-efficiency channel is used when substantially steady-state energy inputs are detected. Energy manager 204, therefore, can substantially maximize energy-conversion efficiency in a manner that enables it to utilize energy inputs that are extremely low-level and/or of a transient or intermittent nature. In some embodiments, a logic circuit is included to determine which channel to engage, as well as disconnect vulnerable circuits when the energy input exceeds a safe level.

High-Efficiency Charging Mode

Under normal operation, the energy harvesters of harvester module 202 receive a substantially continuous mechanical excitation and, therefore, provide a substantially continuous rectified signal 518. In this operating regime, energy manager 204 charges global energy-storage unit 208 via high-efficiency charger 506.

In order to charge global energy-storage unit 208 with the highest efficiency, rectified signal 518 should be maintained at one-half of the open-load output voltage ($V_{OC}$) of the piezoelectric harvesters in harvester module 202. Unfortunately, the voltage on global energy-storage unit 208 is determined by the energy stored in it and does not normally equal to this desired value ($V_{OC}/2$). As a result, energy manager 204 includes a feedback loop that both isolates rectified signal 518 from global energy-storage unit 208 and maintains rectified signal 518 at its desired level. For the purposes of this Specification, including the appended claims, the term "high-efficiency charging" is defined as a charging mode in which the rectified signal 518 is maintained within the range of approximately 40% to approximately 60% of the open-load output voltage of the piezoelectric harvesters of harvester module 202.

Figure 8:
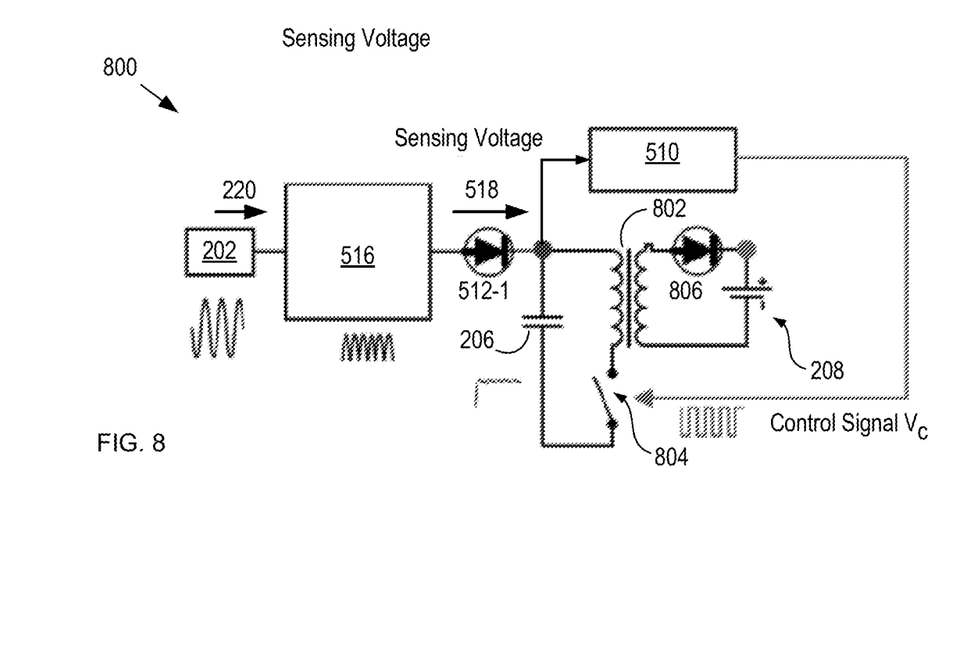
FIG. 8 depicts a schematic drawing of a high-efficiency feedback loop in accordance with the present invention.

FIG. 8 depicts a schematic drawing of a high-efficiency feedback loop in accordance with the present invention. Feedback loop 800 includes controller 510, high-efficiency charger 802, switch 804, and active diode 806.

High-efficiency charger 802 comprises a fly-back transformer (i.e., boost converter) that isolates rectified signal 518 from global energy-storage unit 208 to mitigate issues with the disparity in their voltages.

Switch 804 is a conventional electrical switch that is analogous to switch 514 described above.

Active diode 806 is analogous to active diode 512 described above.

Controller 510 is operative for sensing the voltage level of rectified signal 518 and maintaining its magnitude at a desired level by controlling the working duty cycle of the fly-back interface via control signal $V_c$, which is applied to switch 804. In some embodiments, a series of diodes are included to ensure that the voltage on global energy-storage unit 208 cannot exceed a safe level (e.g., 5.5V in the depicted example).

High-Speed Charging Mode

During operation 404, when a surge in rectified signal 518 that exceeds an input threshold is detected by controller 510, energy manager 204 enters its high-speed charging mode. During this mode, controller 510 closes switch 804 to establish a high-capacity charging path that directly couples the output of converter 502 and global energy-storage unit 208. As a result, both cold-start module 504 and high-efficiency charger 506 are bypassed. This enables as much energy as possible to be stored by the energy-storage system in a short period of time. For the purposes of this Specification, including the appended claims, the term "high-speed charging" is defined as a charging mode in which the output of converter 502 is electrically connected directly with global energy-storage unit 208. In the depicted example, controller 510 closes switch 804 when rectified signal 518 exceeds an input threshold of 5.5V; however, one skilled in the art will recognize that any suitable threshold level for a surge can be used without departing from the scope of the present invention.

Once the voltage on global energy-storage unit 208 reaches desired threshold value 304, sensor node 102 enters Phase IV of cycle 300, in which energy manager 204 powers the components of the sensor node via DC/DC regulator 508 and output power buffer 210, which maintains the voltage provided to these components at a constant level (e.g., 3V) as long as the energy stored in global energy-storage unit 208 is sufficient.

DC/DC regulator 508 is a single-ended primary-inductor converter (SEPIC) that is operatively coupled with output power buffer 210 such that they are collectively operative for maintaining the voltage provided to the components of the sensor node (e.g., sensor, wireless transceiver, etc.) at constant levels to ensure proper and low-power operation of the entire node, as well as its efficient and reliable operation.

DC/DC regulator 508 is located between high-efficiency charger 506 and output power buffer 210 and ensures that the output power buffer is maintained at a voltage level suitable for the operation of each other component in the sensor node (e.g., microcontroller 214, etc.), regardless of the voltage on global energy-storage unit 208. As a result, each component in the sensor node is able to operate at its suitable voltage without risk of over-biasing, which can occur when too much energy is harvested and the main-storage voltage increases beyond the proper set bias for that component. Further, such an arrangement allows the energy-storage unit to be large without giving rise to voltage regulation issues at the module. It should be noted that the use of a supercapacitor in the energy-storage unit extends the operational capacity of a sensor node because excess vibrational energy input can be stored as a reservoir that can be tapped during periods of time when the input energy is insufficient to power the sensor node by itself.

It should be noted that the inclusion of an output power buffer enables operation of the sensor node under varying energy consumption conditions, such as while the node is wirelessly transmitting information to the base station vs. periods of "dormancy" of the sensor node.

The combination of DC/DC voltage regulator 508 and the output power buffer further enables programmable control of a charging operation for starting a charging operation when the output power buffer voltage falls below a set threshold, which ensures that the voltage level always remains above the minimum required value for other components of the sensor node. In some cases, the charging stops when the output buffer reaches a set value (e.g., 2-3V). It should be noted that, preferably, the DC/DC voltage regulator 508 does not consume energy when it is not performing a charging operation.

At operation 405, sensor module 212 senses a variety of environmental factors indicative of the occupancy within its designated area and provides output signal 224 to microcontroller 214 via power and control bus 216.

As part of operation 405, controller 510 provides control signal 528 to conventional switch array 526, which dictates which of the sensors included in sensor module 212 is activated. In some embodiments, switch array 526 is not included and either controller 510, microcontroller 214, or sensor module 212 controls which sensors are activated.

At operation 406, transceiver 218 transmits the occupancy information acquired by microcontroller 214 to base station 104 as signal 106.

Upon termination of the mechanical excitation at the sensor node, sensor node 102 enters an energy-depletion mode (i.e., Phase V of cycle 300), in which the energy stored in global energy-storage unit 208 begins to decrease.

In some embodiments, microcontroller 214 issues a command to sensor module 212 to interrogate one or more of the sensors in sensor module 202 and store their reading in its ferroelectric random-access-memory. In similar fashion, energy manager 204 wakes transceiver 214 up intermittently to enable wireless transmission of the stored readings to base station 104.

It should be noted that sensor sub-system 202 can be interrogated in various ways: 1) on a set schedule; 2) in response to an alert provided by the sensor module that one of the output values of a sensor has changed; or 3) in response to a user-generated demand.

At operation 407, the energy level of energy storage unit 208 is assessed. If above an energy threshold level 304, operations 405 and 406 are repeated as desired. If the energy level of energy storage unit 208 has decreased below energy threshold level 304, method 400 continues with operation 408.

At operation 408, sensor node 102 enters Phase VI of cycle 300 and transmits a status report to base station 104 when the energy stored in global energy-storage unit 208 decreases below energy threshold level 304. In some embodiments, sensor node 102 enters Phase VI when the energy stored in global energy-storage unit 208 decreases below a different threshold value.

At operation 409, energy manager 204 turns off all of the components of sensor node 102, ceasing its operation.

At operation 410, once the energy stored in global energy-storage unit 208 is fully depleted, sensor node 102 returns to its dormant state.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A sensor system comprising a sensor node, wherein the sensor node includes:
   a sensor module including a first sensor for providing a first signal that is based on a first measurand;
   a harvester module including a first energy harvester that is operative for converting a first ambient energy into a first electrical signal, which is provided at a harvester output;
   an energy storage system; and
   an energy manager that includes:
   a converter having a converter input and a converter output, the converter input coupled to the harvester output, the converter configured to convert the first electrical signal into a second electrical signal at the converter output;
   a switch circuit coupled between the converter output and an input of the energy storage system; and
   a charger circuit coupled between the converter output and the input of the energy storage system,
   wherein the energy manager has multiple operational modes for charging the energy storage system, the multiple operational modes including a high-efficiency charging mode and a high-speed charging mode, wherein the energy manager operates in the high-speed charging mode, in which the switch is activated to couple the energy storage system to receive the second electrical signal, when the magnitude of the second electrical signal exceeds an input threshold, and wherein the energy manager operates in the high-efficiency charging mode, in which the charger circuit is configured to charge the energy storage system, when the magnitude of the second electrical signal is less than the input threshold.

2. The sensor system of claim 1 wherein the sensor node further comprises:
   a communications system, the communications system being operative for communicating with a base station.

3. The sensor system of claim 2 wherein the communications system is a wireless communications system.

4. The sensor system of claim 2 further comprising the base station, wherein the base station is operative for providing a control signal that is based on a second signal received from the first sensor node, wherein the second signal is based on the first signal.

5. The sensor system of claim 1 wherein the energy storage system includes a first energy-storage unit and second energy-storage unit, the first energy-storage unit being dimensioned and arranged to power the entirety of the sensor node, and the second energy-storage unit being dimensioned and arranged to selectively power the energy manager.

6. The sensor system of claim 5 wherein the energy manager further includes a cold-start module that selectively charges the second energy-storage unit with only energy of the second electrical signal when the energy stored in the first energy-storage unit is below a first threshold.

7. The sensor system of claim 6 wherein the cold-start module includes a low-dropout regulator.

8. The sensor system of claim 1 wherein the converter includes:
   a first rectifier circuit comprising a plurality of transistors that are characterized by a first turn-on voltage, wherein each transistor of the plurality thereof is biased by the first electrical signal, and wherein the first rectifier circuit rectifies the first electrical signal only when the first electrical signal has a magnitude that exceeds the first turn-on voltage;
   a first active diode that is characterized by a second turn-on voltage, wherein the first active diode is biased by the second energy-storage unit, and wherein the first rectifier circuit and the first active diode are electrically connected in series between a first node and a second node; and
   a second rectifier circuit comprising a Schottky diode, wherein the second rectifier circuit is electrically connected between the first node and second node, and wherein the second rectifier circuit rectifies the first electrical signal when the voltage on the first storage unit is less than the second turn-on voltage.

9. The sensor system of claim 1 wherein the converter includes:
  a first rectifier circuit comprising a plurality of first active diodes that are characterized by a first turn-on voltage, wherein each active diode of the plurality thereof is biased by a first voltage on the second energy-storage unit, and wherein the first rectifier circuit rectifies the first electrical signal only when the first voltage exceeds the first turn-on voltage;
  a second active diode that is characterized by the first turn-on voltage, wherein the first active diode is biased by the first voltage, and wherein the first rectifier circuit and the first active diode are electrically connected in series between a first node and a second node; and
  a second rectifier circuit comprising a Schottky diode, wherein the second rectifier circuit is electrically connected between the first node and second node, and wherein the second rectifier circuit rectifies the first electrical signal when the voltage on the second storage unit is less than the first turn-on voltage.

10. The sensor system of claim 9 wherein the converter further includes:
  a third rectifier circuit comprising a plurality of transistors that are characterized by a first turn-on voltage, wherein each transistor of the plurality thereof is biased by the first electrical signal, and wherein the third rectifier circuit rectifies the first electrical signal only when the first electrical signal has a magnitude that exceeds the first turn-on voltage;
  wherein the first rectifier circuit and third rectifier circuit are electrically connected in parallel.

11. The sensor system of claim 1 wherein the first energy harvester comprises at least one mechanical energy harvester.

12. The system of claim 1, wherein the charger circuit is configured to charge the energy storage system, when the magnitude of the second electrical signal is less than the input threshold and within a predetermined range of the voltage at the harvester output.

13. A sensor system comprising a sensor node, wherein the sensor node includes:
  a sensor module including a first sensor for providing a first signal that is based on a first measurand;
  a harvester module having a first energy harvester for converting a first ambient energy into a bipolar electrical signal that is provided at a first node;
  an energy storage system comprising (i) a first energy-storage unit that is dimensioned and arranged to power the entirety of the sensor node and (ii) a second energy-storage unit that is dimensioned and arranged to selectively power an energy manager when the first energy-storage unit has no stored energy; and
  the energy manager, the energy manager including a converter for converting the bipolar electrical signal into a unipolar electrical signal, wherein the converter includes:
  a first rectification circuit that is electrically connected between the first node and a second node, the first rectification circuit including a Schottky diode, wherein the first rectification circuit rectifies the first electrical signal when the voltage on the first storage unit is less than a first turn-on voltage; and
  a first rectification path that is electrically connected between the first node and the second node, the first rectification path including:
  a first active diode that is characterized by the first turn-on voltage; and
  a second rectification circuit that is electrically connected in series with the first active diode, wherein the second rectification circuit comprises a plurality of transistors that are characterized by a second turn-on voltage, wherein each transistor of the plurality thereof is biased by the first electrical signal, and wherein the second rectification circuit rectifies the first electrical signal only when the first electrical signal has a magnitude that exceeds the first turn-on voltage.

14. The sensor system of claim 13 wherein the first active diode is biased with the first voltage such that the first rectification path is disabled when the first voltage is less than the first turn-on voltage.

15. The sensor system of claim 13 wherein the sensor node further comprises:
  a communications system, the communications system being operative for communicating with a base station, wherein the base station is operative for providing a control signal that is based on a second signal received from the first sensor node, wherein the second signal is based on the first signal.

16. The sensor system of claim 13 wherein the energy manager further includes a cold-start module that selectively charges the second energy-storage unit with only energy of the second electrical signal when the energy stored in the first energy-storage unit is below a first threshold.

17. The sensor system of claim 13 wherein the first energy harvester comprises at least one of a mechanical energy harvester, a photovoltaic device, a thermoelectric device, an RF-energy conversion device, and a turbogenerator.

18. The sensor system of claim 13, further comprising a third rectification circuit connected in series with the first active diode, wherein the third rectification circuit rectifies the bipolar electrical signal only when a first voltage on the second storage unit is equal to or greater than a second value.

19. The sensor system of claim 18 wherein the third rectification circuit comprises a plurality of active diodes, each of which is characterized by a first turn-on voltage that is equal to the second value, wherein each active diode of the plurality thereof is biased by the first voltage such that the first rectifier circuit rectifies the bipolar electrical signal only when the first voltage exceeds the second value.

20. The sensor system of claim 18 wherein the first rectification path includes each of the second rectification circuit and the third rectification circuit, and wherein the second rectification circuit and the third rectification circuit are electrically connected in parallel.

* * * * *